US007168246B2

(12) United States Patent
Toji et al.

(10) Patent No.: US 7,168,246 B2
(45) Date of Patent: Jan. 30, 2007

(54) HYDRAULIC CONTROL DEVICE FOR WORKING MACHINE

(75) Inventors: Yutaka Toji, Hiroshima (JP); Hidekazu Oka, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 11/078,425

(22) Filed: Mar. 14, 2005

(65) Prior Publication Data

US 2005/0204736 A1 Sep. 22, 2005

(30) Foreign Application Priority Data

Mar. 17, 2004 (JP) ............................ 2004-076766

(51) Int. Cl.
*F16D 31/02* (2006.01)

(52) U.S. Cl. .......................................... 60/468; 60/494

(58) Field of Classification Search .................. 60/468, 60/494

See application file for complete search history.

(56) References Cited

U.S. PATENT DOCUMENTS 5,848,531 A * 12/1998 Nakamura et al. ............ 60/426
5,970,709 A * 10/1999 Tohji ........................... 60/421
6,148,548 A * 11/2000 Tohji ........................... 37/348
6,173,734 B1 * 1/2001 Olivas et al. ............... 137/460
6,212,886 B1 * 4/2001 Sugiyama et al. ............ 60/422
2004/0244232 A1 12/2004 Toji

FOREIGN PATENT DOCUMENTS

EP 1 022 395 A1 7/2000
JP 11-303809 11/1999

OTHER PUBLICATIONS

Patent Abstracts of Japan, JP 10-073101, Mar. 17, 1998.

* cited by examiner

*Primary Examiner*—Hoang Nguyen
(74) *Attorney, Agent, or Firm*—Oblon, Spivak, McClelland, Maier & Neustadt, P.C.

(57) ABSTRACT

A hydraulic control device for a working machine includes hydraulic actuators, a hydraulic pump which functions as a hydraulic power source, control valves which control the actuators on the basis of operations by an operating unit, a common bleed-off valve which returns excess oil to a tank via an unload passage on the basis of the operations by the operating unit, and a control unit which controls the common bleed-off valve. The common bleed-off valve is capable of setting a position for closing the unload passage when the common bleed-off valve is in a non-operating state. The control valves have center bypass passages which function as individual bleed-off passages which open when the control valves are in neutral states. Opening characteristics of the control valves are set such that the center bypass passages are closed in initial stroke periods in which the control valves move toward operating positions.

3 Claims, 3 Drawing Sheets

HYDRAULIC CONTROL DEVICE FOR WORKING MACHINE

BACKGROUND OF THE INVENTION

1. Field of the Invention

The present invention relates to an hydraulic control device for a working machine, such as a hydraulic excavator.

2. Description of the Related Art

In a typical hydraulic excavator, bleed-off control is performed in which a part of oil discharged from a pump (excess oil) is returned to a tank. This control is generally performed by varying an opening area of a bleed-off passage provided in a control valve for each actuator depending on a control input of an operating unit. Since this passage is provided, each valve is relatively long in a spool-axis direction, and there are disadvantages regarding cost and installation into a machine.

In addition, a structure in which the above-described passage is omitted and a common bleed-off valve is provided for a plurality of control valves is known. In addition, an electronic control method in which the common bleed-off valve is a hydraulic pilot valve and is controlled by a secondary pressure of a proportional solenoid valve controlled by a controller is also known (refer to, for example, Japanese Unexamined Patent Application Publication No. 11-303809).

This method is advantageous in that there is more freedom in control compared to a hydraulic control method in which a pilot pressure corresponding to a control input is directly transmitted to the common bleed-off valve. However, if an abnormality (fail) occurs in a control system, for example, if the proportional solenoid valve malfunctions or disconnection occurs in a signal system which transmits a control signal from the controller to the proportional solenoid valve, the bleed-off valve stops at the maximum opening position and the entire amount of oil discharged from the pump is unloaded, which makes the machine stop completely. As a result, the machine cannot perform any work at the site.

SUMMARY OF THE INVENTION

An object of the present invention is to provide a hydraulic control device for a working machine which controls a common bleed-off valve by an electronic control method and which can continuously work when a fail occurs in a control system.

A hydraulic control device for a working machine according to an aspect of the present invention basically includes a plurality of hydraulic actuators, a hydraulic pump which functions as a hydraulic power source of the hydraulic actuators, a plurality of control valves which control the actuators on the basis of operations by an operating unit, a common bleed-off valve which returns excess oil discharged from the hydraulic pump to a tank via an unload passage on the basis of the operations by the operating unit, and a control unit which controls the common bleed-off valve. The common bleed-off valve is capable of setting a position for closing the unload passage when the common bleed-off valve is in a non-operating state. In addition, the control valves have center bypass passages which function as individual bleed-off passages which open when the control valves are in neutral states. In addition, opening characteristics of the control valves are set such that the center bypass passages are closed by the control unit in initial stroke periods in which the control valves move toward operating positions.

According to the present invention, when a fail occurs in the common bleed-off valve, the valve closes to ensure the supply of oil to the actuators. In addition, the bleed-off operation (unload operation) is also performed via the center bypass passages of the control valves.

In addition, the center bypass passages, which are the individual bleed-off passages provided in the control valves, have the smallest opening area necessary and are closed in the initial stroke periods of the valves. Accordingly, the primary purpose of using the common bleed-off valve, that is, reduction in spool lengths and sizes of the valves, is achieved.

Accordingly, although the common bleed-off valve is controlled by the electronic control method, work can be continued when a fail occurs in the control system.

DESCRIPTION OF THE PREFERRED EMBODIMENT

A hydraulic control device according to an embodiment of the present invention will be described below with reference to FIGS. 1 to 3.

In this embodiment, a common bleed-off valve is used for bleed-off control of three hydraulic actuators 1, 2, and 3.

Figure 1:
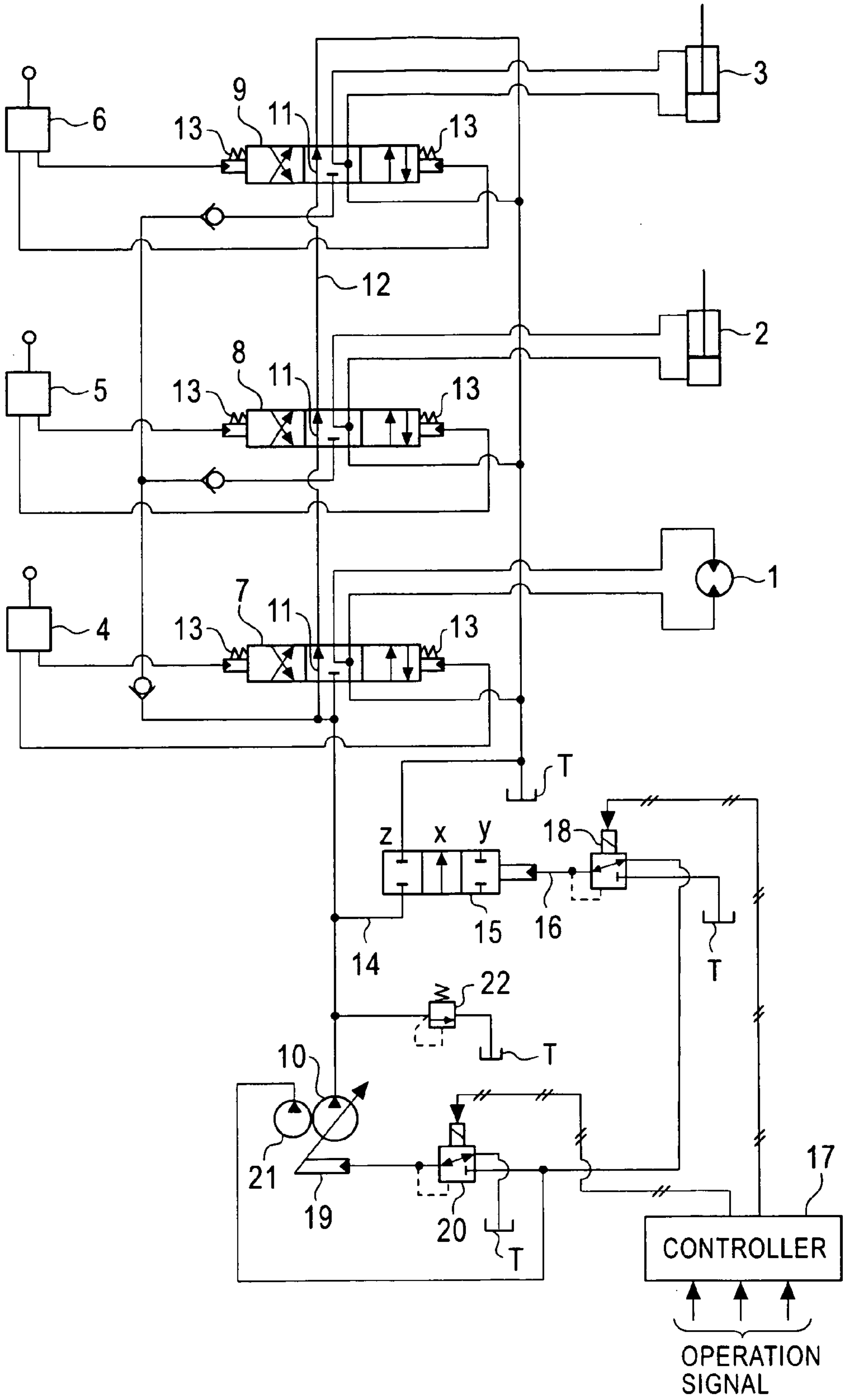
FIG. 1 is a circuit diagram according to an embodiment of the present invention.

As shown in FIG. 1, the actuators 1, 2, and 3 are connected to a variable displacement (capacity) hydraulic pump 10 via hydraulic pilot control valves 7, 8, and 9 controlled by remote control valves 4, 5, and 6, respectively, which serve as control units.

The control valves 7 to 9 are connected to the hydraulic pump 10 and a tank T such that they are parallel to each other, and the actuators 1 to 3 are individually controlled by their respective control valves 7 to 9.

In addition, the control valves 7 to 9 are provided with center bypass passages 11 which function as individual bleed-off passages and open at neutral positions. The center bypass passages 11 are connected to the tank T via a center bypass line 12 which connects the control valves 7 to 9 in tandem.

More specifically, the bleed-off operation of each actuator is ensured by the corresponding center bypass passage 11.

The control valves 7 to 9 are returned to the neutral positions by return springs 13. As shown by the solid line A in FIG. 2, each of the return springs 13 is a two-step spring which exerts a small spring force (rate of change in the spring force with respect to a spool stroke to be correct) in an initial stroke period (period from stroke 0 to stroke S1) until the corresponding center bypass passage 11 closes, and a large spring force after the center bypass passage 11 is closed (period from stroke S1 to the maximum stroke Smax).

Figure 2:
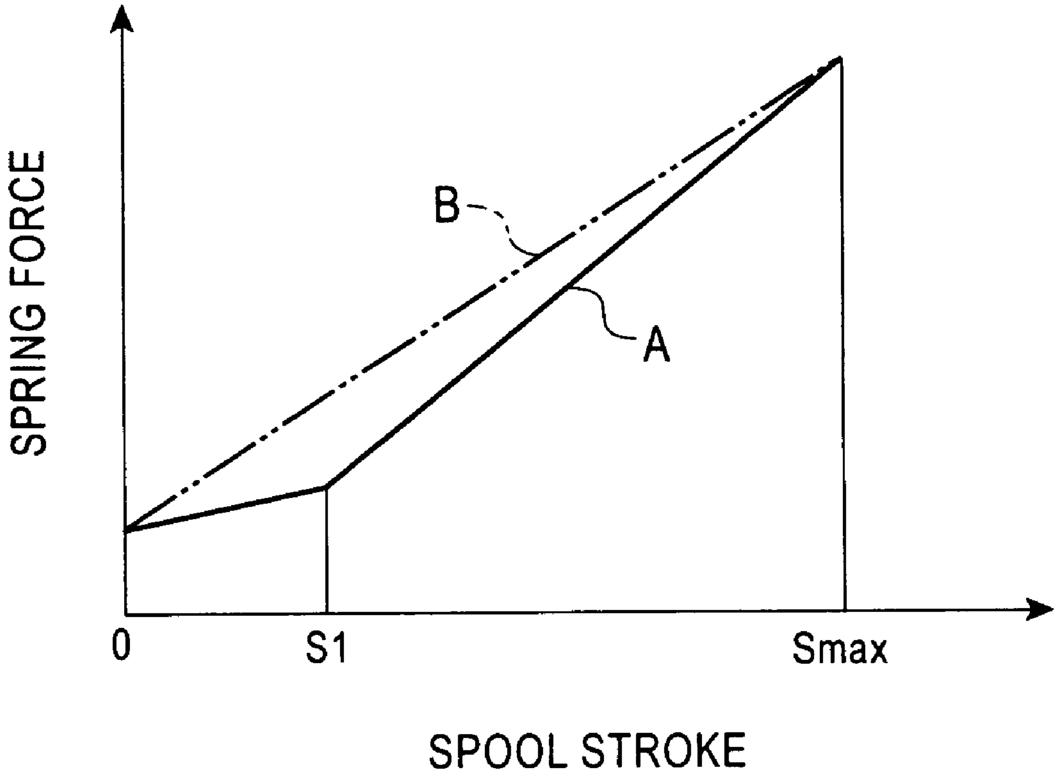
FIG. 2 is a diagram showing a spring characteristic of a return spring provided for each control valve according to the embodiment.

The two-dot dash line B in FIG. 2 shows a spring characteristic of a normal return spring. As is clear from FIG. 2, in this spring characteristic, the spring force changes linearly from the minimum spool stroke (0) to the maximum spool stroke (Smax).

As shown in FIG. 1, a common bleed-off passage 14 is provided between an output pipe of the hydraulic pump 10 and the tank T. In addition, a hydraulic pilot common bleed-off valve 15 for performing bleed-off control of the actuators 1 to 3 together is provided on the common bleed-off passage 14.

The common bleed-off valve 15 is capable of setting an unload position (maximum opening position) x where the opening area is at a maximum and a block position y where the opening area is 0, and performs bleed-off control between these two positions x and y.

In addition, the common bleed-off valve 15 is also capable of setting a fail safe position z which serves as a non-operating (neutral) position, and an unload passage is completely closed (opening are is 0) at the fail safe position z.

A proportional solenoid valve 18 controlled by a controller 17 is connected to a pilot line 16 of the common bleed-off valve 15. A secondary pressure of the proportional solenoid valve 18 is supplied to a pilot port of the common bleed-off valve 15 as a pilot pressure.

More specifically, the controller 17 and the proportional solenoid valve 18 define a control unit, and the common bleed-off valve 15 is controlled by the control means.

A pump regulator 19, which controls the discharge rate (that is, swash angle) of the hydraulic pump 10, is controlled by a proportional solenoid regulator control valve 20. The regulator control valve 20 is controlled by a signal from the controller 17 which is based on the operations of the remote control valves 4 to 6. More specifically, operation signals based on the operations of the remote control valves 4 to 6 are transmitted to the controller 17, and the regulator control valve 20 is controlled by a signal from the controller 17.

Thus, the hydraulic pump 10 is controlled by a positive control method in which the pump discharge rate increases as the control inputs of the remote control valves 4 to 6 increase.

In this case, in a multi-operational state in which two or more of the remote control valves 4 to 6 are in operation, the pump control may be performed on the basis of either an operation signal from a remote control valve corresponding to the highest control input or an operation signal from a predetermined remote control valve.

Reference numeral 21 denotes an auxiliary hydraulic pump which serves as a hydraulic power source common to the proportional solenoid valves 18 and 20, and reference numeral 22 denotes a relief valve.

In this structure, in a normal state, when the remote control valves 4 to 6 are operated, the controller 17 outputs a signal based on the operation signals from the control valves 4 to 6 to the regulator control valve 20 and the proportional solenoid valve 18. Then, the pump discharge rate is varied depending on the control inputs of the remote control valves 4 to 6 by the positive control method, and the common bleed-off valve 15 operates between the unload position x and the block position y to vary a bleed-off flow rate.

Next, a case is considered in which an abnormality (fail), such as disconnection, occurs in a control system connecting the controller 17 and the proportional solenoid valve 18 and the proportional solenoid valve 18 becomes uncontrollable. If the above-described system of the related art is applied, the common bleed-off valve 15 stops at the unload position x and almost all of the discharged oil is returned to the tank T. In comparison, according to the present embodiment, the common bleed-off valve 15 stops at the fail safe position z.

In this state, the unload passage of the common bleed-off valve 15 is entirely closed, and accordingly the supply of oil to actuator circuits is ensured even when a fail occurs.

In this case, the bleed-off operation of the actuators 1 to 3 is performed by the center bypass passages 11 in the control valves 7 to 9.

More specifically, when the common bleed-off valve 15 fails, the valve 15 closes to ensure the supply of oil to the actuators 1 to 3, and the bleed-off operation (unload operation) is performed by the control valves 7 to 9.

When a necessary and sufficient bleed-off function is to be performed by the control valves 7 to 9, spool lengths along the axes thereof are increased and the sizes of the control valves 7 to 9 are increased accordingly. Therefore, the primary purpose of using the common bleed-off valve 15, that is, reduction in sizes of the valves 7 to 9, cannot be achieved.

Figure 3:
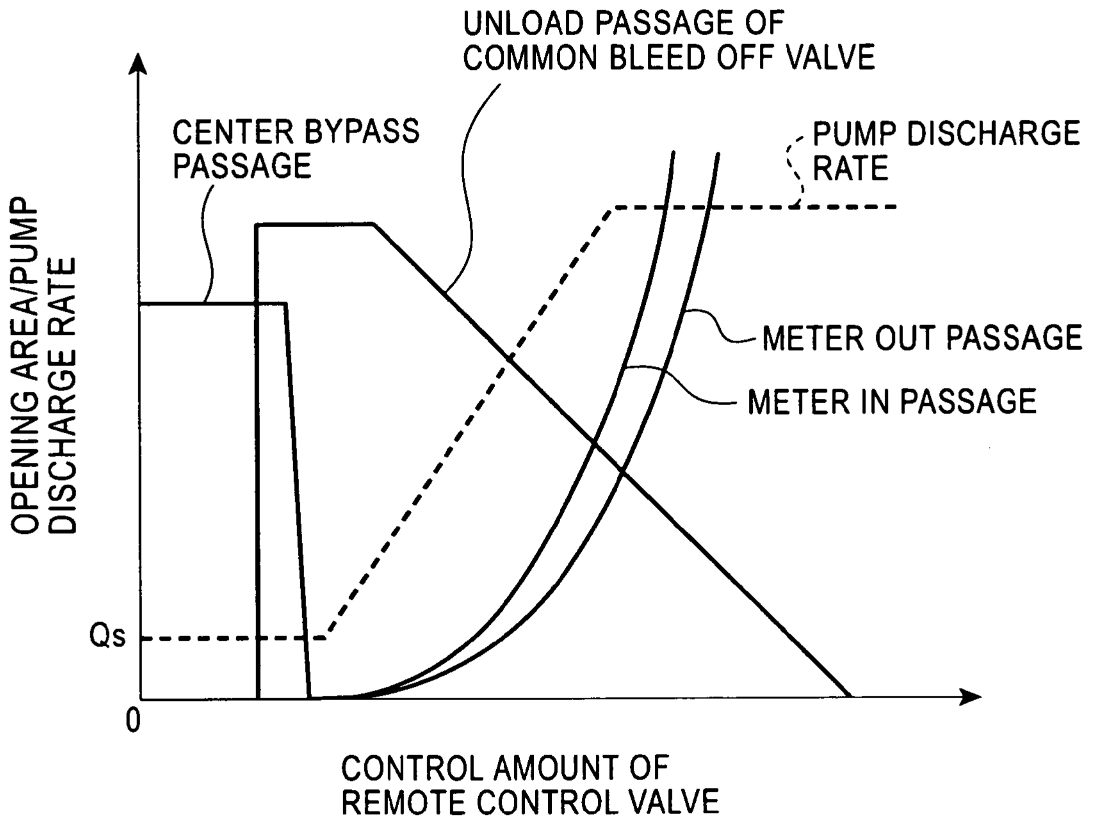
FIG. 3 is a diagram showing characteristics of opening areas of control valves and a common bleed-off valve and pump discharge rate according to the embodiment.

Accordingly, in the present embodiment, the opening characteristics of the control valves 7 to 9 including the center bypass passages 11 and the common bleed-off valve 15 with respect to the control inputs of the remote control valves 4 to 6 are set as shown in FIG. 3.

More specifically, when the control valves 7 to 9 are at the neutral positions (when the control inputs of the remote control valves 4 to 6 are 0), the center bypass passages 11 are fully opened. Then, when the remote control valves 4 to 6 are operated from this state (full open state) and stroke operations of the spools of the control valves 7 to 9 start, the center bypass passages 11 are closed immediately.

Immediately before the center bypass passages 11 close, the common bleed-off valve 15 switches from the fail safe position z to the unload position x, and the unload passage opens to the maximum opening area. Accordingly, common bleed-off control is performed between the unload position x and the block position y.

Thus, the center bypass passages 11 of the control valves 7 to 9 which perform the individual bleed-off operations have the smallest opening area necessary and are closed in the initial stroke periods of the valves 7 to 9. Accordingly, the primary purpose of using the common bleed-off valve 15, that is, reduction in spool lengths and sizes of the control valves 7 to 9 is achieved.

In addition, the unload passage of the common bleed-off valve 15 opens immediately before the center bypass passages 11 of the control valves 7 to 9 close. Therefore, the bleed-off control of the valve 15 is performed without blank.

In addition, the present embodiment further provides the following effects:

(i) As described above, the return springs 13 of the control valves 7 to 9 are two-step springs (see FIG. 2). Therefore, when the remote control valves 4 to 6 are operated, the center bypass passages 11 of the control valves 7 to 9 instantaneously change from full open to full close, and there is no time loss before the bleed-off control is started by the common bleed-off valve 15.

(ii) As shown in FIG. 3, the controller 17 controls the pump regulator 19 such that the pump discharge rate is at a minimum, that is, at a standby flow rate (minimum flow rate) Qs when the remote control valves 4 to 6 are not operated (non-operating state in which the control valves 7 to 9 are at neutral positions). Accordingly, the sizes of the control valves 7 to 9 can also be further reduced by reducing the opening areas of the center bypass passages 11 of the control valves 7 to 9.

As described above, the present invention is suitably applied to the case in which the positive control method is used and the pump discharge rate is varied depending on the control inputs of the remote control valves 4 to 7. However, the present invention may also be applied to cases in which the positive control method is not used, for example, a case in which the pump discharge rate is maintained at a maximum.

Although the invention has been described with reference to the preferred embodiments in the attached figures, it is noted that equivalents may be employed and substitutions made herein without departing from the scope of the invention as recited in the claims.

What is claimed is:

1. A hydraulic control device for a working machine, comprising:

a plurality of hydraulic actuators;

a hydraulic pump which functions as a hydraulic power source of the hydraulic actuators;

a plurality of operating means which may be manipulated by a control amount;

a plurality of control valves which control the actuators on the basis of operations by the operating means, wherein the control valves have center bypass passages which function as individual bleed-off passages which open when the control valves are in neutral states;

a common bleed-off valve which returns excess oil discharged from the hydraulic pump to a tank via an unload passage on the basis of the operations by the operating means, wherein the common bleed-off valve has a position for closing the unload passage when the common bleed-off valve is in a non-operating state; and control means for controlling the common bleed-off valve and the control valves based on an operating signal of the operating means, such that the center bypass passages are closed in initial stroke periods in which the control valves move toward operating positions and the unload passage of the common bleed-off valve is opened immediately before the center bypass passages of the control valves close.

2. The hydraulic control device for the working machine according to claim 1, wherein the control valves are returned to neutral positions by return springs, each of the return springs being a two-step spring which exerts a small spring force in the initial stroke period until the corresponding center bypass passage closes and a large spring force after the center bypass passage is closed.

3. The hydraulic control device for the working machine according to claim 1, wherein the hydraulic pump is a variable capacity hydraulic pump whose discharge rate is controlled by a pump regulator, and the control means controls the pump regulator such that the discharge rate is set to a standby flow rate when the operating means is in a non-operating state.

* * * * *